United States Patent [19]

Rinn et al.

[11] Patent Number: 5,049,371

[45] Date of Patent: Sep. 17, 1991

[54] PROCESS FOR THE PREPARATION OF MONODISPERSE CERAMIC POWDERS

[75] Inventors: Günter Rinn; Rüdiger Nass, both of Zellingen, Fed. Rep. of Germany

[73] Assignee: Fraunhofer-Gesellschaft zur Förderung der Angewandten Forschung e.V., Munich, Fed. Rep. of Germany

[21] Appl. No.: 263,883

[22] Filed: Oct. 28, 1988

[30] Foreign Application Priority Data

Oct. 29, 1987 [DE] Fed. Rep. of Germany ....... 3736686

[51] Int. Cl.$^5$ ............. C01B 13/14; C01G 23/04; C01G 25/02; C01G 19/02
[52] U.S. Cl. ................................. 423/592; 423/278; 423/339; 423/608; 423/609; 423/610; 423/611; 423/612; 423/618; 423/625; 423/626; 423/629; 423/630; 423/631; 501/103; 501/133; 501/134; 501/152; 501/153; 501/154
[58] Field of Search ............... 423/278, 339, 608, 609, 423/592, 610, 611, 618, 612, 625, 626, 629, 630, 631; 502/349, 350, 355, 439; 501/103, 133, 134, 152, 153, 154

[56] References Cited

U.S. PATENT DOCUMENTS

| | | | |
|---|---|---|---|
| 4,520,114 | 5/1985 | David | 423/608 |
| 4,543,341 | 9/1985 | Barringer et al. | 501/103 |
| 4,609,746 | 9/1986 | Barfurth et al. | 556/40 |
| 4,610,866 | 9/1986 | Debsikdar et al. | 423/600 |
| 4,619,908 | 10/1986 | Cheng et al. | 423/338 |
| 4,719,091 | 1/1988 | Wusirika | 501/103 |
| 4,724,134 | 2/1988 | Sood | 501/134 |
| 4,732,750 | 3/1988 | Olson et al. | 423/609 |
| 4,778,671 | 10/1988 | Wusirika | 423/592 |
| 4,792,539 | 12/1988 | Yamanaka et al. | 423/610 |
| 4,898,842 | 2/1990 | David | 501/153 |

FOREIGN PATENT DOCUMENTS

| | | | |
|---|---|---|---|
| 0191231 | 11/1982 | Japan | 423/618 |
| 0110427 | 7/1983 | Japan | 423/618 |
| 0674990 | 6/1979 | U.S.S.R. | 423/610 |

*Primary Examiner*—Michael L. Lewis
*Assistant Examiner*—Steven Bos
*Attorney, Agent, or Firm*—Oblon, Spivak, McClelland, Maier & Neustadt

[57] ABSTRACT

A novel process is described for the preparation of monodisperse ceramic powders wherein particulate oxides or hydroxides are obtained by reaction of hydrolysable compounds with water. The reaction is carried out in the presence of a complexing agent and, optionally, a stabilizer.

13 Claims, 4 Drawing Sheets

PROCESS FOR THE PREPARATION OF MONODISPERSE CERAMIC POWDERS

The present invention relates to a process for the preparation of monodisperse ceramic powders and in particular a process for the preparation of particulate oxides and hydroxides which after suitable further processing furnish monodisperse ceramic powders.

The center of attention of ceramic research in recent years has been the chemical synthesis of fine powders. Known processes use for this purpose, for example, pyrolysis of metal alkoxides, hydrothermal treatment of metal oxide gels and hydrolysis of metal alkoxides. By these processes it is possible to prepare monodisperse particles having a mean diameter in various sizes, depending on the process and reaction conditions employed. However, a reproducible preparation of monodisperse oxide powders in various particle sizes is difficult. In the case of hydrolysis of, for example, metal alkoxides, it is important for the growth of monodisperse particles in solution that the formation of nuclei is homogeneous and that no supersaturations occur during the growth of the nuclei. That means that, on the one hand, care must be taken that nuclei form at all, but that, on the other hand, spontaneous precipitation during the addition of water must be prevented.

A further condition for the growth of monodisperse particles is preventing agglomeration of particles in the process of growing. Steric stabilization may be used for this purpose, for example by adding surface-active polymers, such as hydroxypropylcellulose (HPC), as described for example in Ceramic Bulletin, vol. 65, No. 12, 1986, pages 1574 to 1577, for the preparation of monodisperse titanium oxide powders.

The object of the present invention is to make available a process which makes it possible to prepare monodisperse oxide and hydroxide particles in a reproducible manner and in the process to control the particle size essentially by varying a single parameter.

Figure 1:
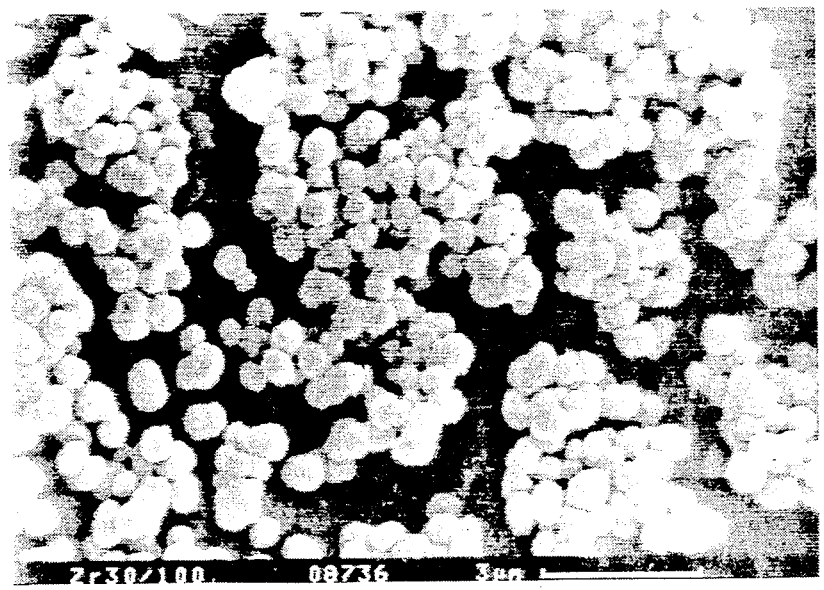
FIGS 1-8 in the drawings are SEM photomicrographs of the zirconium oxide powders dried at 100° C. and ignited at 700° C. It has been found, surprisingly, that this object may be achieved if the hydrolysis of a hydrolysable compound is carried out in the presence of a complexing agent.

The invention accordingly relates inter alia to a process for the preparation of particulate oxides and hydroxides by reacting hydrolysable compounds with water in an organic solvent, in which process the reaction is carried out in the presence of a complexing agent.

The compounds are preferably compounds of aluminum, vanadium, titanium, zirconium, hafnium, tin, uranium, boron or silicon, the compounds of aluminum, titanium and zirconium being particularly preferred.

The starting compounds must be reactive toward water, i.e. they must be hydrolysable, and in addition they must be soluble in substantial concentrations of the solvents employed. Suitable compounds preferably possess the general formula $$MR_n \qquad (I)$$

in which M represents the central atom, n equals the valency of M and the groups R, which may be the same or different, can be split off by water. Since the groups R are at any rate removed in the hydrolysis, it is desirable from the economical standpoint that they have the simplest possible structure, that they are, for example, halogen, alkyl, alkoxy or acyloxy groups, although according to the invention groups with a more complex structure may be used, such as, for example, hydrocarbon radicals, branched or unbranched, which contain one or more multiple bonds and/or are substituted by substituents such as, for example, halogen, alkoxy, nitro or dialkylamino. These groups can be attached to the metal atom, for example as such, or, for example, via an oxygen atom, a nitrogen atom, a carbonyl group or an oxycarbonyl group.

Particularly preferred radicals R in the above formula (I) are halogen atoms (fluorine, chlorine, bromine and iodine, in particular Cl and Br); alkyl groups of 1 to 8, preferably 1 to 4, carbon atoms, for example methyl, ethyl, n-propyl, i-propyl, n-butyl, i-butyl and sec-butyl; alkoxy groups of 1 to 8, preferably 1 to 4, carbon atoms, for example methoxy, ethoxy, i-propoxy, n-propoxy, n-butoxy, i-butoxy, sec-butoxy, pentoxy and 2-ethylhexyloxy; and acyloxy radicals of 2 to 8, preferably 2 to 4 carbon atoms, for example acetoxy. Of these radicals, the above alkoxy groups are preferred most.

Compounds of titanium and especially zirconium are particularly preferred for the process according to the invention, particularly when in the above formula (I) the four radicals R are identical and represent alkoxy radicals of 1 to 4 carbon atoms.

It is of course also possible to use already partly hydrolysed or partly precondensed starting compounds, provided these dissolve in the solvent to a considerable degree. Mixtures of compounds which are derived from a single or several elements, for example metals, may be also used. For doping purposes it is desirable to carry out the hydrolysis of the starting compound in the presence of a small amount of a compound of another element, for example Ca, Mg, Ba, Y, Nb, Ta etc., which may or may not be hydrolysable. It is also possible to use the complexing agent not as such but as a complex with the corresponding element. Thus, for example, some or all of a hydrolysable starting compound may be used in the form of a complex compound.

As to the element which is to be converted to the oxide or hydroxide, it may also prove to be advantageous to use other hydrolysable compounds, for example oxychlorides and nitrates instead of or in addition to the compounds already referred to above. However, as already mentioned above, in quite general terms any compound of the desired element which reacts with water and dissolves satisfactorily in the solvent, is suitable.

Concrete examples of particularly preferred compounds are: $AlCl_3$, $Al(OC_2H_5)_3$, $Al(OC_3H_7)_3$; $TiCl_4$, $Ti(OC_2H_5)_4$, $Ti(OC_3H_7)_4$, $Ti(O-i-C_3H_7)_4$, $Ti(OC_4H_9)_4$, $Ti(2\text{-ethylhexoxy})_4$, $Ti(\text{acetylacetonato})_2(O-i-C_3H_7)_2$; $ZrCl_4$, $Zr(OC_2H_5)_4$, $Zr(OC_3H_7)_4$, $Zr(O-i-(C_3H_7)_4$, $Zr(OC_4H_9)_4$, $Zr(2\text{-ethylhexoxy})_4$; $VOCl_3$, $V(OC_2H_5)_3$, $VO(OC_2H_5)_3$; $SnCl_4$; $B(OCH_3)_3$, $B(OC_2H_5)_3$; $SiCl_4$, $Si(OCH_3)_4$, $Si(OC_2H_5)_4$, $Si(OC_3H_7)_4$.

The solvents for the process according to the invention must dissolve the components, but must not react with them to such a degree that the hydrolysis is hindered or prevented. Solvents with a boiling point which is not too high, for example as below 100° C., are preferred, since the solvent must be later removed from the precipitated oxide or hydroxide. Polar organic solvents are preferred; although non-polar solvents may be also used. Particularly preferred solvents are alcohols, in particular methanol, ethanol, n-propanol, i-propanol, butanol and mixtures thereof. Other solvents which may be used according to the invention are, for example, methylene chloride, chloroform, carbontetrachloride, ether, particular diethyl ether and tetrahydrofuran, ketones, for example acetone and butanone, esters, for example ethyl acetate, pentane, hexane, cyclohexane, benzene as well as mixtures of these solvents.

Compounds which are suitable as complexing agents for the process according to the invention are essentially all those which are capable of forming a complex with the hydrolysable compound present in the solvent. The complexing agent coordinates itself for example via an atom with free electron pairs to the central atom of the hydrolysable compound. The compounds which are accordingly suitable as complexing agents are those which have available at least 2 atoms of the group O, N and S. Complexing agents which coordinate themselves to the central atom via oxygen atoms, are particularly preferred according to the invention. To this group of compounds belong, for example, the $\beta$-dicarbonyl compounds. Particularly suitable complexing agents are accordingly compounds of the general formula

(II)

in which $R^1$ and $R^4$ each represent alkyl groups of 1 to 4 carbon atoms, particularly methyl or ethyl, or alkoxy groups of 1 to 4 carbon atoms, in particular methoxy and ethoxy, and $R^2$ and $R^3$ which may be the same or different, denote hydrogen, halogen and alkyl of 1 to 4 carbon atoms, in particular hydrogen.

Acetylacetone and ethyl acetoacetate are particularly preferred representatives of compounds of the general formula (II).

Other examples of current complexing agents which may be employed successfully in the process according to the invention, are ethylenediamine, S-methylmercaptoacetic acid, N,N-diethylcarbamic acid, oxalic acid, salicylaldehyde, 2,2'-bipyridyl, 1,10-phenantroline, diethylenetriamine, triethylenetetramine, nitrilotriacetic acid, ethylenediaminetetraacetic acid, pyrocatechol and related compounds.

Rather, the complexing agent is not confined to the named compounds, but other compounds may also act as complexing agents, such as, for example, dimethylformamide and dimethylacetamide.

In a particularly preferred embodiment of the present invention, the process according to the invention is carried out in the presence of a stabilizer. Any compound which is able to prevent an agglomeration, i.e. the phenomenon of the growing nuclei adhering to one another in the solution, may be used as stabilizer. Such compounds act as protective colloids, i.e. as a result of steric or electrostatic repulsion the particles enclosed by the stabilizers are unable to approach each other close enough to coalesce. If appropriate, the stabilizer can increase the viscosity of the solution to such an extent that the particles are able to move in relation to one another with considerably reduced velocity and the probability of collision is thus reduced. Accordingly any conceivable anionic, cationic or neutral surfactant and protective colloid is suitable for the process according to the invention, provided it is soluble in the system and does not exert a reciprocal action on, or react with, the other components of the system in an undesirable manner. Examples of common stabilizers are gelatin, casein, gum arabic, lysalbinic acid, starch, polyvinyl alcohol, polyvinylpyrrolidone and poly(meth)acrylates. Other examples may be found, for example, in Ullmanns Enzyklopädie der technischen Chemie, 4th edition, vol. 22, pages 455 to 500. Stabilizers which are particularly preferred according to the invention, are cellulose derivatives, in particular cellulose esters and cellulose ethers. Concrete examples of such compounds are benzylcellulose, ethylcellulose, methylcellulose, hydroxyethylcellulose, hydroxypropylcellulose and carboxymethylceullulose. The molecular weight of the stabilizer can fluctuate within a wide range and is generally between 10,000 and 2,000,000, particularly between 20,000 and 1,000,000. It should be borne in mind that normally with increasing molecular weight solubility decreases and viscosity of the solution increases. It is also possible to use two or more different stabilizers or similar types of stabilizers with different molecular weights. It is only important that the stabilizer fulfills its purpose, viz. prevention of agglomeration. Hydroxypropylcellulose, particularly hydroxypropylcellulose of a molecular weight between 50,000 and 100,000, may be mentioned as a particularly preferred example of a stabilizer.

In many cases it may also be advantageous to carry out the hydrolysis in the presence of an acid. This is particularly so if no acid compound is produced in the hydrolysis (hydrolysis of halides leads, for example to the formation of hydrohalic acids). Without the addition of acid, either the hydrolysis products may remain in solution during the hydrolysis (for example in the presence of large amounts of complexing agent; or a spontaneous, random precipitation may occur (only small amounts of complexing agent being present).

In principle, any inorganic or organic acid which is soluble in the solvent, may be used as the acid. However, care should be taken that the acidic anion can be later readily removed from the precipitate or the ceramic powder, for example by thermal decomposition. Examples of suitable acids are nitric acid, sulfuric acid and hydrohalic acids as well as formic acid, acetic acid and propionic acid. Nitric acid is particularly preferred.

The concentrations of the compounds referred to above which can be used in the process according to the invention, naturally depend on many factors, for example the solvent, the hydrolysable compound, the concentration of the other components present etc. However, a person skilled in the art may readily determine by a few orientation tests the optimum concentrations for the desired purpose. Moreover, quantitatively defined concentration ratio are also given further below for a concrete embodiment of the process according to the invention.

It is possible to determine in quite general terms whether the hydrolysable compound may be present in the solvent in any concentration, provided that it dissolves in the solvent. A lower limit of concentration is fixed by the consideration that the resultant hydrolysates should not be soluble to any marked degree in the reaction mixture, since otherwise yield would suffer.

The concentration of the complexing agent is that magnitude which in the process according to the invention determines to a considerable measure the size of the resultant hydrolysate particles. It follows that the particle size may be controlled by the amount of complexing agents added, the particle size increasing with increasing concentration of complexing agent. Although there is no generally valid upper limit for the amount of complexing agent added, already for reasons of economy a higher molar ratio of complexing agent to hydrolysable compound than 1:1 is not advisable. Besides, too large amounts of complexing agent may result in a precipitate no longer being formed. If, on the other hand, too little complexing agent is added, gelling may occur.

As already mentioned above, the presence or absence of an acid also plays a role in the precipitation characteristics of the hydrolysate in the solvent, in addition to the complexing agent concentration.

The concentration of the stabilizer must be sufficient to stabilize the suspension, i.e. for a given stabilizer to prevent as completely as possible agglomeration of the growing and of the already grown hydrolysate particles. The upper limit of the stabilizer concentration is governed by the viscosity of the resultant solution and thus particularly by the molecular weight of the stabilizer and the type of the solvent employed. Furthermore, the stabilizer must be soluble in the amounts used.

As mentioned above, the most favorable concentration of the acid depends on the concentration of the complexing agent. However, in contrast to the complexing agent concentration, the concentration of the acid exerts no marked influence on the particle size. The concentration of the acid must be high enough for no spontaneous precipitation to occur, yet at the same time it must ensure supersaturation of the solution.

The amount of water used for the hydrolysis should usually be sufficient to effect a complete hydrolysis, but not be so high that the hydrolysates redissolve to a marked degree. It is preferred that the total of water, acid and complexing agent is not yet sufficient to replace all groups present on the central metal atom. That means that, for example, in the case of a compound $MR_4$, less than 4 mol, preferably about 3 mol of water + acid + complexing agent should be present per mol of this compound.

In the concrete case of the hydrolysis of an ethanolic solution of zirconium tetrapropylate in the presence of hydroxypropylcellulose as stabilizer, acetylacetone as complexing agent and nitric acid as the acid, the zirconium propylate is preferably present in the form of 0.1 to 2, preferably 0.5 to 1, molar solutions. If the concentrations are too high, formation of agglomerates increasingly occurs during the hydrolysis. The addition of about 15 g of hydroxypropylcellulose per mol of zirconium is thus already sufficient to ensure an undisturbed growth of the particles and to stabilize the resultant suspension. The mean diameter of the particles varies depending on the amount of acetylacetone added. The higher the acetylacetone concentration, the larger the particles. A nitric acid concentration between 0.7 to 1.0 mol per mol of zirconium compound thus leads to the best results. Amounts which are considerably below this range, produce clear solutions (at high acetylacetone concentration and low amounts of water), gelling (average complexing agent concentration, large amount of water) or anomalous precipitate formation (low complexing agent concentration and large amounts of water), depending on experimental conditions. Amounts of water in the region from 1.5 to 2.5 mol of water per mol of zirconium compounds are particularly favorable for the course of the reaction; greater amounts of water lead to an increasing particle size and agglomeration and even to a diminishing yield (due to redissolution of the particles).

The process according to the invention is preferably carried out in such a manner that the hydrolysable compound, the complexing agent and, optionally, the stabilizer are dissolved in the solvent, followed by the addition of water and, optionally, of the acid with vigorous stirring. The addition of water may be carried out in one or in several portions, the addition in one portion being more advantageous, since this may bring about a simultaneous formation of all the nuclei, which is usually advantageous for the preparation of a monodisperse system.

The reaction temperature has no great importance for the process according to the invention. It is basically only limited at the lower end by the freezing point of the solvent or by viscosity of the solution at low temperatures, while at the upper end the boiling point of the solvent represents a natural limit. The process according to the invention is usually carried out at room temperature or at slightly elevated temperature, an increase in temperature having a favorable influence on the rate of reaction. Thus, for example, it was found that in the above case of hydrolysis of zirconium tetrapropylate the time from the start of the reaction to the beginning of the precipitation was about 2 hours at room temperature, but only a few minutes at 40° to 60° C. Similarly, several hours were required at room temperature for the precipitation to be complete, while a slightly elevated temperature effects a complete precipitation in 15 to 30 minutes.

The precipitate may then be isolated in a manner known per se, for example by centrifugation or filtration. This is followed as usual by a purification of the precipitate by washing with a solvent in which the precipitate is insoluble. Non-polar solvents, such as, for example, low-boiling petroleum fractions, petroleum ether, hexane etc., are particularly suitable as such solvents. Subsequently the liquid still adhering to the precipitate is removed in a known manner, for example by heating. An alternative procedure is first to redisperse the precipitate, followed by spray drying. Finally any undesirable residues still remaining in the monodisperse metal oxide particles, originating, for example, from the complexing agent, stabilizer or the acid, may be decomposed or volatilized by heating to higher temperatures, for example >400° C.

The monodisperse ceramic powders prepared according to the invention are particularly suitable for the manufacture of ceramic components to which they impart an improved sintering characteristic. Furthermore, a better powder consolidation produces a more homogeneous pore distribution in the green body. Furthermore, non-agglomerated metal oxide powders with a defined porosity are also suitable as carrier material for catalysts.

The example below elucidates in greater detail the present invention.

EXAMPLE 40 ml of an ethanolic solution of $Zr(i-OPr)_4$ at a concentration of 1 mol per liter were mixed with 20 ml of a 5% ethanolic solution of hydroxypropylcellulose and 10 ml of ethanol. Subsequently there were added, in four separate experiments, 1.2, 1.6, 2.0 or 2.4 g of acetylacetone, equivalent to a concentration of 0.30, 0.40, 0.50 and 0.60 mol of acetylacetone per mol of Zr, and a mixture consisting of 2.1 ml of 65% $HNO_3$ and 0.6 ml of water. The reaction solutions were mixed until homogeneous and then kept in a water bath for 1 hour at 40° C.

The precipitated powders were designated as Zr 30, Zr 40, Zr 50 and Zr 60, corresponding to the acetylacetone concentration.

The isolation of the precipitates was carried out by adding to the suspension dropwise 50 ml of petroleum ether with stirring. The particles were then centrifuged and redispersed in a mixture of 25 ml of ethanol and 20 ml of petroleum ether. A further 30 ml portion of petroleum ether was then added in an ultrasonic bath. The subsequent spray drying of the suspensions produced powders free from agglomerates. These powders were characterized by thermal analysis and electron microscopy.

When the powders were heated to temperatures between 200° and 400° C., they incurred a weight loss of about 40%, due to the decomposition of nitrates and volatile organic compounds. The carbon formed by thermal decomposition of the zirconium-acetylacetone complex was removed by heating at temperatures above 650° C. in air.

Figure 2:
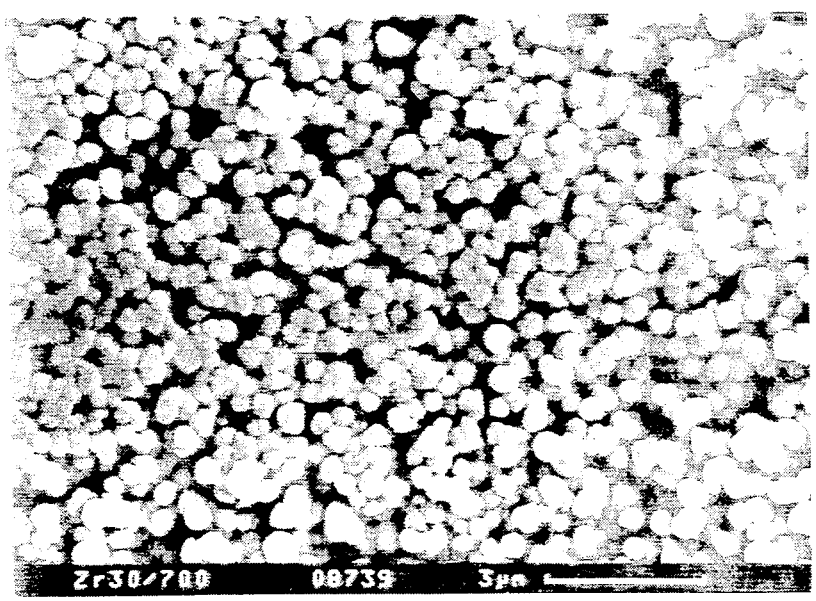
Figure 3:
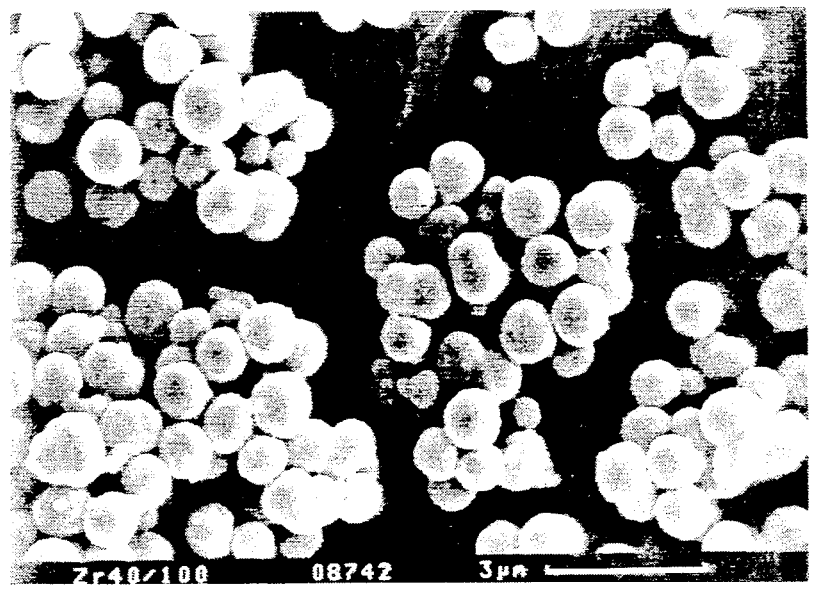
Figure 4:
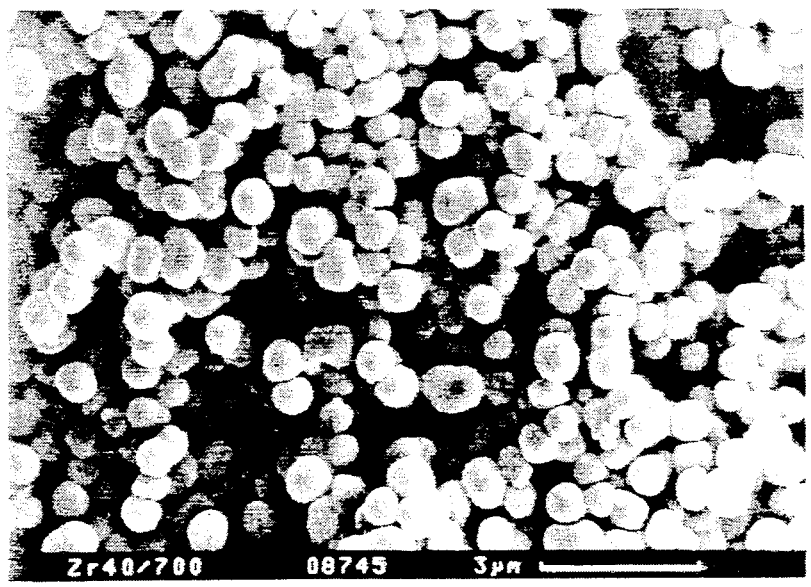
Figure 5:
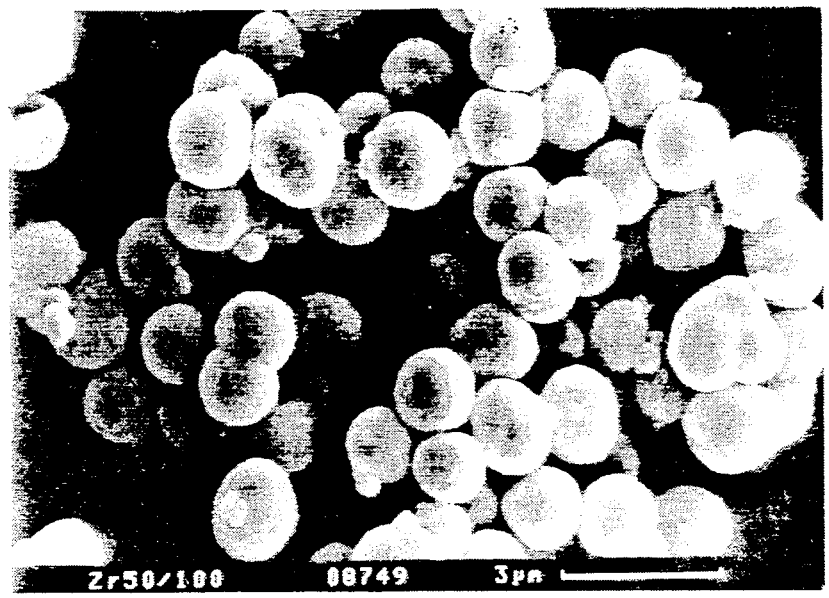
Figure 6:
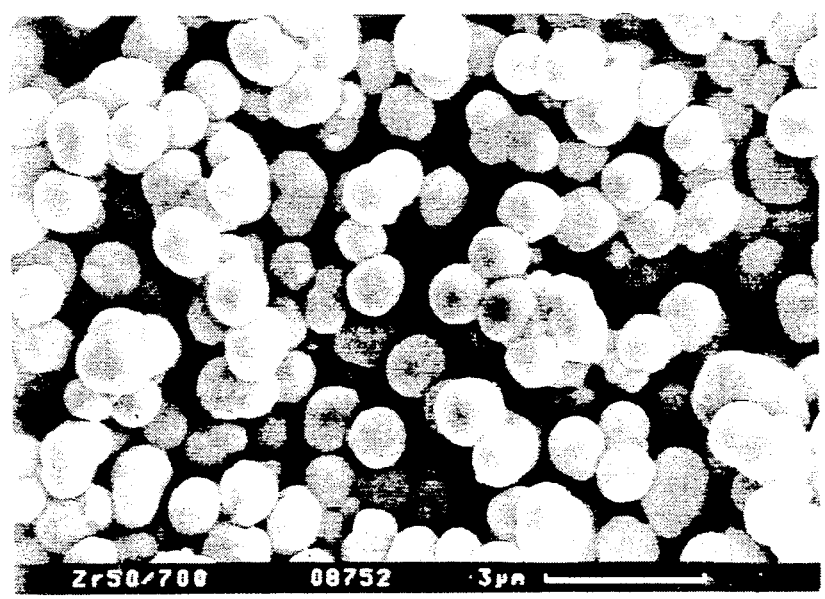
Figure 7:
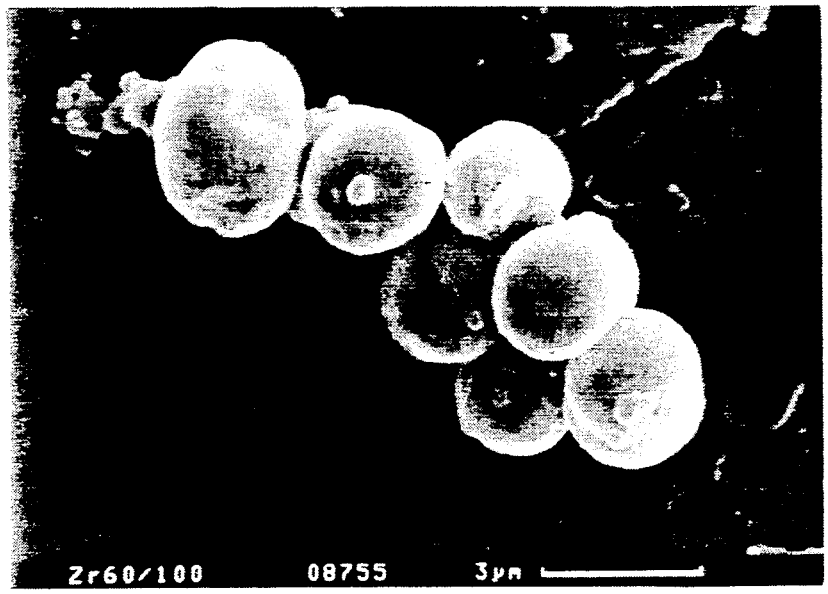
Figure 8:
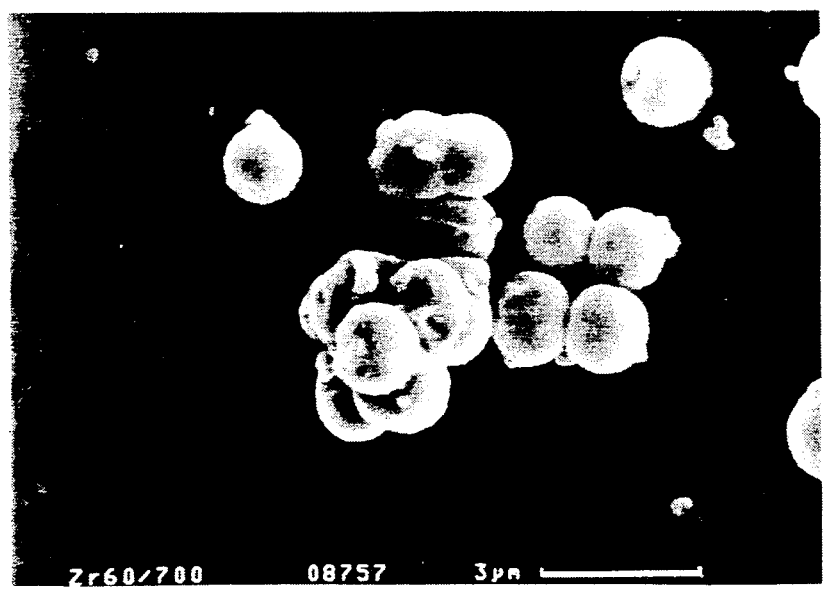

The attached FIGS. 1 to 8 are SEM photomicrographs of the zirconium oxide powders dried at 100° C. and ignited at 700° C. While the FIGS. 1, 3, 5 and 7 show the particles Zr 30, Zr 40, Zr 50 and Zr 60 after drying at 100° C., FIGS. 2, 4, 6 and 8 relate to the corresponding particles after igniting at 700° C. As can be seen from these Figures, the mean diameter of the particles increases with increasing acetylacetone concentration, so that after drying at 100° C. particles having a mean diameter of 0.6, 1.0, 1.5 and 2.5 μm were obtained. Igniting at 700° C. produced linear shrinkage of the particles of up to 40% with the result that the mean diameters were in the region between 0.4 and 1.5 μm.

We claim:

1. In a process for the preparation of particulate oxides and hydroxides by reacting hydrolyzable compounds with water in the presence of a complexing agent containing at least two atoms of O, N or S in an organic solvent the improvement wherein the reaction is carried out in the presence of a cellulose ether or a cellulose ester as a stabilizer, wherein the complexing agent is present in an amount effective to ensure the oxide or hydroxide particles of a desired size are formed, increasing amounts of complexing agent causing increasing size of the oxide or hydroxide particles, and wherein an acid concentration is maintained effective to prevent spontaneous, random precipitation or failure of precipitation of the oxide or hydroxide particles, and wherein the precipitated particles form a powder after being isolated and dried.

2. In a process for the preparation of particulate oxides and hydroxides by reacting hydrolyzable compounds of Ti or Zr with water in the presence of a complexing agent containing at least two atoms of O, N or S in an organic solvent the improvement wherein the complexing agent is present in an amount effective to ensure the oxide or hydroxide particles of a desired size are formed, increasing amounts of complexing agent causing increasing size of the oxide or hydroxide particles, and wherein an acid concentration is maintained effective to prevent spontaneous, random precipitation or failure of precipitation of the oxide or hydroxide particles, and wherein the precipitated particles form a powder after being isolated and dried.

3. In a process for the preparation of ceramic powders which comprises the following stages:
   a) reaction of a hydrolyzable compound with water in an organic solvent;
   b) isolation of the resultant precipitate; and
   c) calcination of the precipitate, the improvement wherein stage a) is carried out int he presence of a cellulose ether or a cellulose ester as a stabilizer and a complexing agent containing at least 2 atoms of O, N or S in an amount effective to ensure that oxide or hydroxide particles of a desired size are formed, increasing amounts of complexing agent causing increasing size of the oxide or hydroxide particles, and wherein an acid concentration is maintained effective to prevent spontaneous, random precipitation or failure of precipitation of the oxide or hydroxide particles, and wherein the precipitated particles form a powder after being isolated and dried.

4. In a process for the preparation of ceramic powders which comprises the following stages:
   a) reaction of a hydrolyzable compound of Ti or Zr with water in an organic solvent;
   b) isolation of the resultant precipitate; and
   c) calcination of the precipitate, the improvement wherein stage a) is carried out int he presence of a complexing agent containing at least 2 atoms of O, N or S in an amount effective to ensure that oxide or hydroxide particles of a desired size are formed, increasing amounts o f complexing agent causing increasing size of the oxide or hydroxide particles, and wherein an acid concentration is maintained effective to prevent spontaneous, random precipitation or failure of precipitation of the oxide or hydroxide particles, and wherein the precipitated particles form a powder after being isolated and dried.

5. The process as claimed in claim 1 or 3, wherein hydroxypropyl-cellulose is used as the stabilizer.

6. The process as claimed in any of claims 1–4, wherein the hydrolyzable compound has the general formula $$MR_4 \qquad (I)$$

in which M represents Ti or Zr, and the groups R, which may be the same or different, denote halogen, alkyl or 1 to 8 carbons atoms, alkoxy of 1 to 8 carbon atoms or acyloxy of 2 to 8 carbon atoms.

7. The process as claimed in claim 6, wherein in the formula (I), R is Cl, Br, alkyl of 1 to 4 carbon atoms, alkoxy of 1 to 4 carbon atoms, or acyloxy of 2 to 4 carbon atoms.

8. The process as claimed in claim 6, wherein in the formula (I) the groups R denote identical alkoxy radicals of 1 to 4 carbon atoms.

9. The process as claimed in claim 6, wherein in the formula (I R denotes ethoxy, n-propoxy, i-propoxy or butoxy.

10. The process as claimed in any of claim 1–4, wherein methanol, ethanol, n-propanol, i-propanol or mixtures thereof are used as the organic solvent.

11. The process as claimed in any of claims 1–4, wherein a β-dicarbonyl compound having the general formula

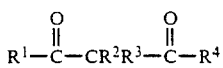

in which $R^1$ and $R^4$ which may be the same or different, each represent $C_{1-4}$-alkyl or $C_{1-4}$-akloxy, and $R^2$ and $R^3$ which may be the same or different, denote hydrogen, halogen and $C_{1-4}$-alkyl, is used as complexing agent.

12. The process as claimed in claim 11, wherein acetylacetone, ethyl acetoacetate, or mixtures thereof is used as the complexing agent.

13. The process as claimed in any of claims 1-4, wherein the reaction is carried out in the presence of nitric acid.

* * * * *